No. 624,736. Patented May 9, 1899.
W. W. & A. T. BARTON.
MACHINE FOR CLIPPING HORSES, SHEARING SHEEP, &c.
(Application filed Nov. 22, 1898.)
(No Model.)
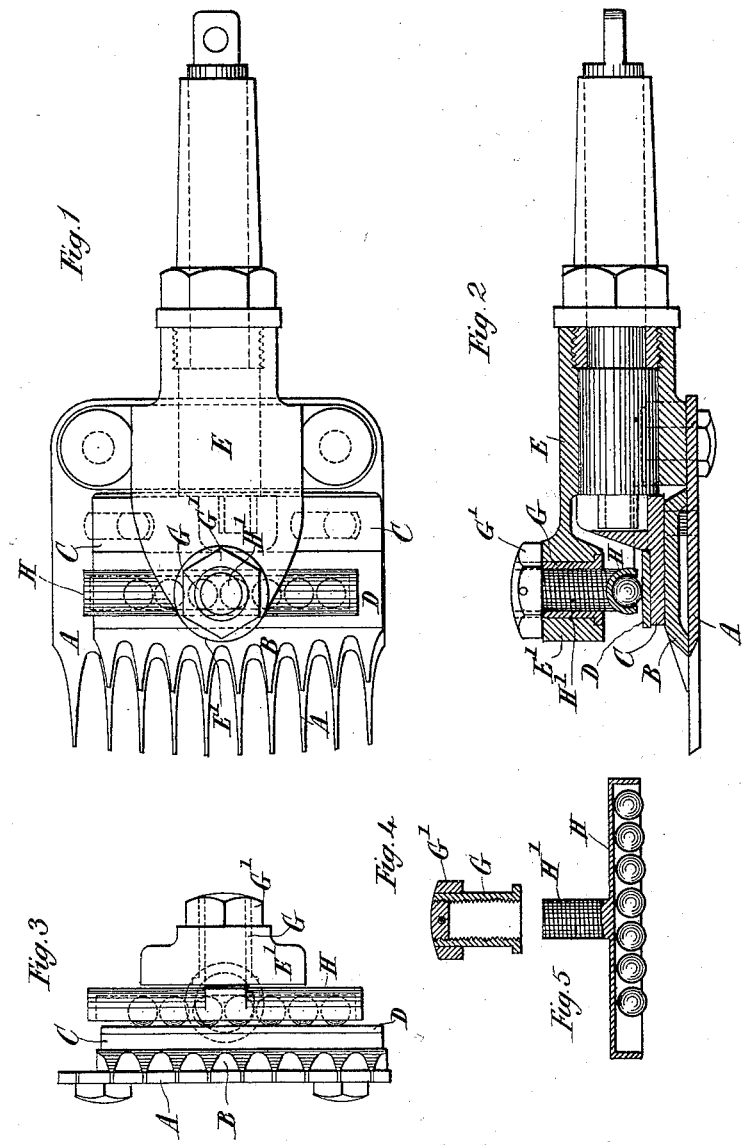
Witnesses:—
Edward Vieser.
George Barry Jr.
Inventors.
William W. Barton
Arthur T. Barton
By attorneys
Brown & Seward

UNITED STATES PATENT OFFICE.

WILLIAM W. BARTON AND ARTHUR T. BARTON, OF LONDON, ENGLAND.

MACHINE FOR CLIPPING HORSES, SHEARING SHEEP, &c.

SPECIFICATION forming part of Letters Patent No. 624,736, dated May 9, 1899.

Application filed November 22, 1898. Serial No. 697,166. (No model.)

*To all whom it may concern:*

Be it known that we, WILLIAM WALTER BARTON and ARTHUR THOMAS BARTON, of London, W., England, have invented a new and useful Improvement in Machines for Clipping Horses, Shearing Sheep, and for other Like Purposes, of which the following is a specification.

In the accompanying drawings, Figure 1 is a plan view of a horse-clipper or sheep-shearing apparatus, which is one form of apparatus to which the invention may be applied. Fig. 2 is a longitudinal section of the same, and Fig. 3 is a front view. Figs. 4 and 5 are details which will be more fully referred to hereinafter.

The object of this invention is to effect in a simple and efficient manner the requisite amount of pressure or tension on the moving parts of apparatus where the close contact of the moving parts is required; and the invention consists in a novel application of balls or their equivalents, as rollers or rockers, whereby the necessary pressure may be given without undue friction.

For the purpose of explaining the invention the improvements will be described as applied to what is known as a "horse-clipper."

In the drawings we have shown the invention as applied to a horse-clipper constructed according to specification of United States Patent No. 548,189, granted to Mott. G. Gillette October 22, 1895, and we shall therefore only refer to such parts as are necessary to a proper understanding of the invention.

A is the comb or finger-plate, and B is the reciprocating knife or cutter-bar. Riveted to the cutter B is a plate C, which is operated in the manner described in the said specification or in any other convenient manner, and this plate carries a bearing-plate D of steel.

The cover E for the driving mechanism is formed with a boss or enlargement E', which is bored out to receive a loose internally-threaded flanged sleeve G, (see detached view, Fig. 4,) and this boss forms an abutment for the pressure device. This sleeve is held in the boss E' by the nut G', which is secured thereto by a pin or in any other convenient manner, the end of the sleeve being plugged, as shown. The cover or abutment E is bolted to the finger-plate A or is secured thereto in any other well-known manner.

The pressure or tension device consists of a metal piece H, trough-shaped in cross-section and having at the center of its length a stem H', as shown in Fig. 5. In this trough means for overcoming friction are inserted, such means being balls, as shown, or their equivalents, as rollers or rockers. The stem H' is threaded to correspond to the internal thread of the sleeve G, and the thread will be so formed that when turning the nut on the sleeve in the direction, as it were, to unscrew it, or from right to left, the stem of the tension device will be driven outward, and pressure will thus be put on the plate of the cutter-bar. By turning the nut in the opposite direction the stem will be drawn back and the pressure will be released.

It will of course be understood that the application of this tension device to a horse-clipper is described by way of example only and that the invention is not confined to such horse-clipper, sheep-shearer, or similar apparatus.

We claim—

In apparatus for applying pressure to a surface moving in contact with a fixed surface, the combination of a fixed abutment, a flanged internally-threaded sleeve mounted loosely in the abutment, and secured by a nut arranged to turn with the sleeve, and a pressing device, comprising a trough-shaped piece containing antifriction appliances, and having a threaded stem, to take into the threaded sleeve, all substantially as described, and operating in the manner set forth.

London, England, November 11, 1898.

WILLIAM W. BARTON.
    ARTHUR T. BARTON.

Witnesses:
  H. K. WHITE,
  H. F. C. GOLTZ.